(12) United States Patent
Cohen et al.

(10) Patent No.: US 7,266,536 B2
(45) Date of Patent: Sep. 4, 2007

(54) CALIBRATED CLASSIFIERS WITH THRESHOLD COMPARISONS

(75) Inventors: Ira Cohen, Sunnyvale, CA (US); Moises Goldszmidt, Moss Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 420 days.

(21) Appl. No.: 10/932,386

(22) Filed: Sep. 2, 2004

(65) Prior Publication Data

US 2006/0047614 A1 Mar. 2, 2006

(51) Int. Cl.
*G06F 9/44* (2006.01)
*G06N 7/02* (2006.01)
*G06N 7/06* (2006.01)

(52) U.S. Cl. ............................................ 706/52
(58) Field of Classification Search ............... 706/52
See application file for complete search history.

(56) References Cited

U.S. PATENT DOCUMENTS

| 5,649,068 | A | 7/1997 | Boser et al. ............... 706/12 |
| 6,745,184 | B1 | 6/2004 | Choi et al. ................. 707/6 |
| 6,760,465 | B2* | 7/2004 | McVeigh et al. .......... 382/103 |
| 2003/0018592 | A1 | 1/2003 | Srinivasa et al. .......... 706/8 |
| 2003/0126103 | A1 | 7/2003 | Chen et al. ................ 706/50 |
| 2004/0002931 | A1 | 1/2004 | Platt et al. ................. 706/46 |

* cited by examiner

*Primary Examiner*—David Vincent
*Assistant Examiner*—Michael B. Holmes (57) ABSTRACT

A classifier is calibrated to produce a calibration map and a threshold is derived from the calibration map. A probability assignment produced by the classifier for input data is then compared to the threshold.

33 Claims, 5 Drawing Sheets

CALIBRATED CLASSIFIERS WITH THRESHOLD COMPARISONS

BACKGROUND

Classifiers are used for a variety of applications in the software and hardware arts. For example, a classifier may be used to identify inappropriate emails, to identify unsolicited email (SPAM), to identify potential viruses, to project the performance or load of hardware and/or software resources, and the like. In some instances, a classifier may assign a probability to a given portion of input data, where that probability reflects a confidence factor that the given portion of input data belongs to a given classification. In this manner, an actual assignment to a given classification can be configured based on a certain probability value being exceeded, met, or not met. Probability assignments permit classifiers to be used in a variety of different automated decision making tasks where alternative choices may be made and where selections are made based on those choices which have higher probability assignments vis-à-vis other alternative choices. Consequently, classifiers may also be used and/or embedded within artificial intelligence applications and systems.

A classifier will include some degree of error, which means that the classifier does not always process perfectly against all types of input data and in all possible situations which may arise. Accordingly, classification errors can occur for a variety of reasons, such as new data previously not encountered by a classifier, new situations not encountered by the classifier, undetected logic errors included in the classifier, standard error margins associated with algorithms that are implemented within the classifier, etc.

DETAILED DESCRIPTION

Figure 1:
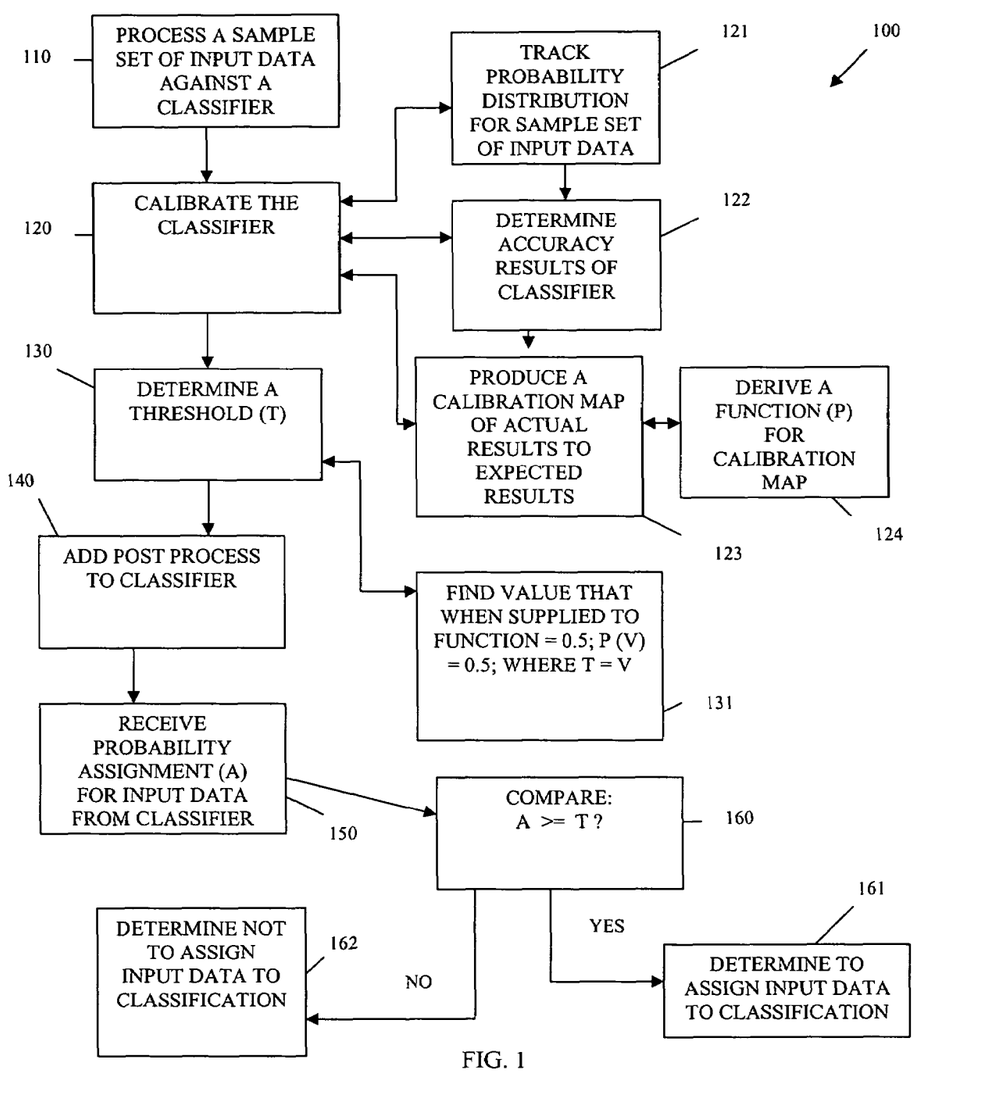
FIG. 1 is a diagram of a method for calibrating a classifier, according to an example embodiment.

FIG. 1 is a diagram of one method 100 to calibrate a classifier, according to an example embodiment. The method 100 (hereinafter "processing") is implemented in a machine-accessible and readable medium and is optionally accessible over a network. A portion of the processing is used to acquire a threshold for a calibrated classifier. The resolved threshold is then used in a remainder of the processing to augment a decision making process of the classifier as a post process to that classifier.

The classifier is any service, application, and/or system designed to receive input data and assign probabilities to that input data, where the probabilities indicate whether the input data belongs or does not belong in a pre-defined classification. The technique or algorithm implemented in the classifier can be any commercially available or custom-developed technique or algorithm. Generally, classifiers extract a set of features from the input data and various combinations of particular features within the input data are processed by the algorithms of the classifiers in order to generate the probability assignments.

The lowest theoretical error rate that any particular classifier can achieve is referred to as the Bayes' error rate. That is, for a given classifier and given set of features; the classifier cannot achieve a lower error rate than the Bayes' error rate. Moreover, the Bayes' error rate is not computable. Therefore, to understand the optimal lowest error rate, the Bayes' error rate is often bounded. One technique to place a bound on the Bayes' error rate is achieved by calibrating a given classifier. Calibration is a process by which the accuracy of the classifier's assigned probabilities for an input data is resolved. The probabilities are associated with how likely the input data belongs to a given classification or category.

One technique for calibration is to process a known set of input data against a given classifier. This results in a probability distribution for the components of the input data, where the probability distribution comprises individual probability assessments for each component. The probability assessment is a confidence factor representing the degree to which the classifier believes that a particular component of the input data belongs to a given classification.

Generally, the probability assessment is expressed within the range of 0-1, representing a percentage value. The known results for the set of input data are plotted along side of the probability distribution of the classifier. Next, a mapping between the produced results of the classifier and the expected or known results are produced. The mapping may be referred to as a calibration map. Ideally, a well-calibrated classifier has a mapping of 0, meaning that the produced results of the classifier mimicked identically the expected results. Of course, the ideal situation is not generally the case, in which case the calibration map produces a calibration for a given classifier.

The calibration map for the classifier may be represented as a derived function using a variety of existing techniques for generating functions from a set of data points, such as table look-ups, etc. Moreover, as stated above, a calibrated classifier provides a bound for the theoretical Bayes' error.

The goal with a classifier to is to minimize its error rate and thereby increase its accuracy rate. In doing this, the quality of the results produced by the classifier and the decisions relied upon are improved. A technique to correct potential errors of a given classifier is to alter its final decision. Thus, one can look at a decision produced by the classifier and then decide whether to accept it as it is or to change it based on what one can discern about the classifier and its performance. Much can be learned about a particular classifier during the calibration process.

From the calibration map one can find a decision rule produced by the classifier that is optimal. That is, it provides an error rate that is equal to or less than the error rate of the decision rule of the classifier prior to calibration. Stated another way, the calibration map may be thought of as a new calibrated classifier having a single feature (F), such that a 0.5 threshold on its probability output value is optimal.

The probability that is produced by the original classifier for our 0.5 probability may be found by inspecting the calibration map at the location where the calibration map has the 0.5 probability. Moreover, if the calibration map is represented as a derived function (P) then one can solve P for a value V that produces the 0.5 probability: P (V)=0.5. V gives the threshold (T) of the original classifier where one can assume any input (X) having a probability assignment (A) for a classification which meets or exceeds the threshold should belong as a member of that classification.

The found V becomes a T for the original classifier. This means that when the classifier produces an A for a given classification for a given set of features included in X, the A can be compared against the T and a decision of the original classifier altered to decide whether X belongs to the given classification or does not belong to the given classification. Stated differently, when X has an A produced by the classifier that meets or exceeds T (A>=T) then X is associated with the classification; otherwise X is not associated with the classification (A<T).

With this context presented, the processing of the method 100 is now described herein and below. Referring to FIG. 1, at 110, a sample set of input data is processed through a classifier. Next, the classifier is calibrated, at 120. In one embodiment, calibration entails, at 121, tracking a probability distribution for the sample set of input data. The probability distribution is a set of probability assignments assigned to discrete portions of the sample set of input data. Each probability assignment (A) identifies a confidence factor that the classifier has for a portion of the input data as to its membership within a given classification.

At 122, the accuracy results of the classifier for the sample set of input data are determined. One way to do this is to know which discrete portions of the sample input data belong to the classification and to know which portions do not belong to the classification. These known or expected results are compared to the actual results produced by the classifier in order to determine the accuracy of the classifier.

At 123, a calibration map is produced from the actual results of the classifier and the expected results. The calibration map is a mapping between the actual and expected results. In one embodiment, at 124, the calibration map may be used to derive a function P, where P mimics the mapping of the calibration map. P may be automatically derived through a variety of mathematical techniques, such table look-ups, etc.

Next, at 130, a threshold T is determined or derived. In one embodiment, at 131, T is derived by finding value V such that P (V)=0.5, where T =V. Once T is known, the decision making process of the original classifier may be altered by adding, at 140, a post process comparison onto the end of the original classifier's processing.

That is, after T has been established from calibrating the original classifier, a small script or application is interjected after the processing of the original classifier. The script compares, at 160, probability assignments A associated with input data, where A is received, at 150, from the classifier against the established T. If A>=T, at 161, then the script associates the corresponding input data with a given classification; otherwise, at 162, the script does not associated the input data with the given classification.

The method 100 demonstrates how during calibration a threshold may be determined, where that threshold is used to alter an original classifier's decisions. This alteration improves the accuracy of the classifier and does not increase the error rate of the classifier. Moreover, the classifier is not altered in any manner; it processes in a normal fashion and its decisions altered based on comparisons to the derived threshold.

Figure 2:
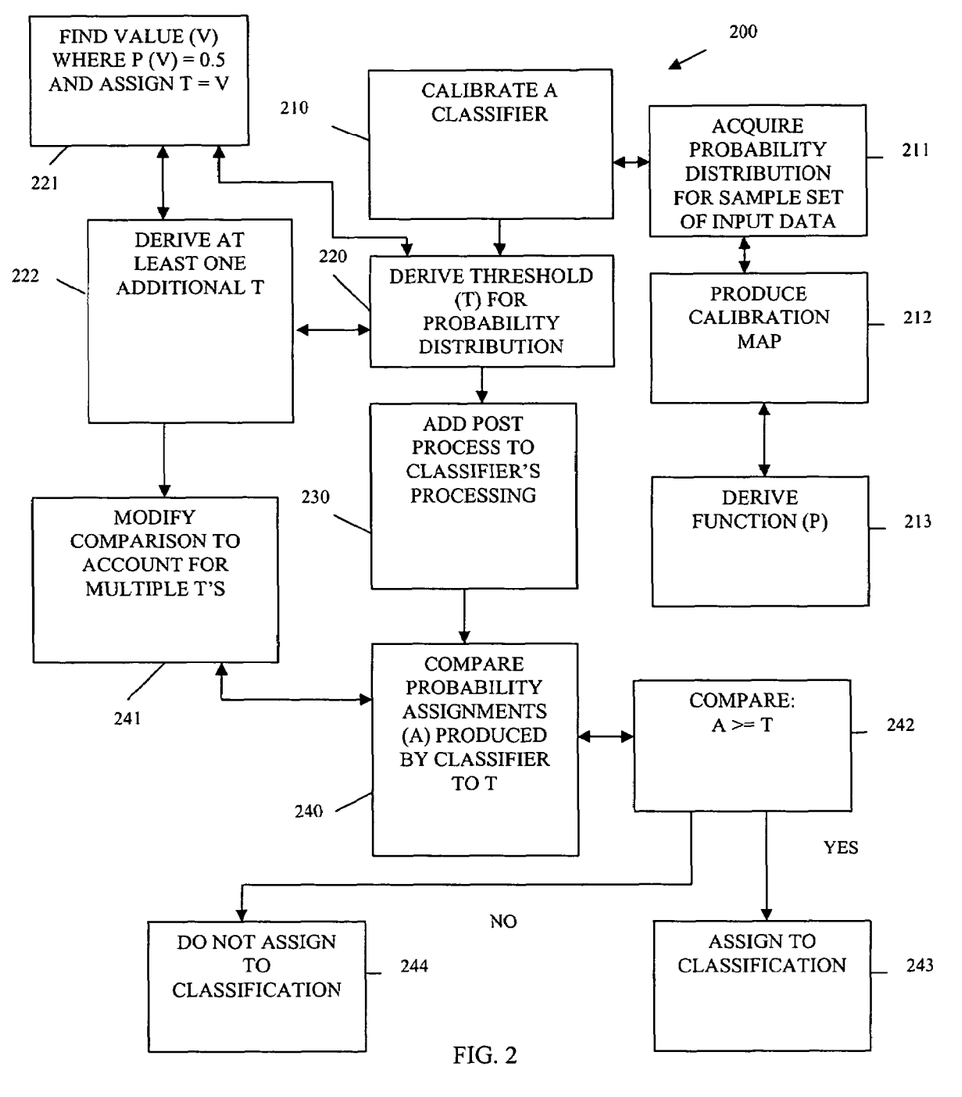
FIG. 2 is a diagram of another method for calibrating a classifier, according to an example embodiment.

FIG. 2 is a diagram of another method 200 to calibrate a classifier, according to an example embodiment. The method 200 is implemented in a machine-accessible and readable medium and is optionally accessible over a network. The processing of the method 200 derives a threshold during calibration, and the threshold becomes a mechanism for which classification decisions of an original classifier may be altered in order to improve the accuracy of that classifier without actually modifying or interfering with the processing of the classifier.

Accordingly, at 210, a given classifier is calibrated. This entails processing a sample set of input data through the given classifier. The output produced by the classifier is a series of probability assignments (A's) for discrete portions of the input data. The combined A's represent an acquired, at 211, probability distribution for the given classifier. When known or expected results for the sample set of input data is compared and mapped to the probability distribution of the classifier, then, at 212, a calibration map is produced. The relationships within the calibration map between actual (classifier produced) and known (expected) results may be automatically modeled as a function P. That is, at 213, a calibration mapping function P is derived from the calibration map.

At 220, a threshold is derived from the probability distribution of the calibrated classifier. The threshold is the point or points within the calibrated classifier where a probability of 0.5 is produced. This indicates that it is appropriate to classify input data having features which produce this probability within the calibrated classifier into a given classification. Correspondingly, in one embodiment, at 221, the calibrated classifier may be mined to find a value V which when supplied to the calibrated classifier produces a probability of 0.5. One technique for doing this is to solve P (V)=0.5, where P is a derived function that models the calibrated classifier.

In some cases, a given classifier may actually produce multiple threshold values that when supplied to a calibrated version of that classifier produces the desired 0.5 probability for a given classification. Thus, at 222, for some classifiers at least one additional threshold (T) is derived for the calibrated versions of those classifiers. This means that in some cases at least two thresholds are derived from a single calibrated classifier.

Once the threshold is determined for a calibrated classifier, at 230, a post process comparison to the original processing of the classifier is added to the back end of the classifier. The purpose of this post process is to, at 240, compare probability assignments made by the classifier for input data supplied to the classifier against the threshold. In some instances, at 241, the post process is modified to account for comparing two or more thresholds against the classifier's probability assignment.

At 242, the comparison is made to determine if a given probability assignment (A) is greater than or equal to the threshold (T). If, at 243, A>=T, then the associated portion of input data is assigned to a given classification. If, at 244, A<=T, then the associated portion of input data is not assigned to the given classification. Although the comparison technique has been presented as greater than or equal to the threshold in order to determine whether to assign to a given classification, this is done for purposes of illustration only, since any comparison may be used with embodiments presented herein without departing from the invention.

The method 200 presents techniques for acquiring a threshold for a calibrated classifier. The threshold is used as a comparison value to potentially alter decisions made by an original classifier. This comparison improves the accuracy of the original classifier without modifying the processing of the original classifier in any manner.

Figure 3:
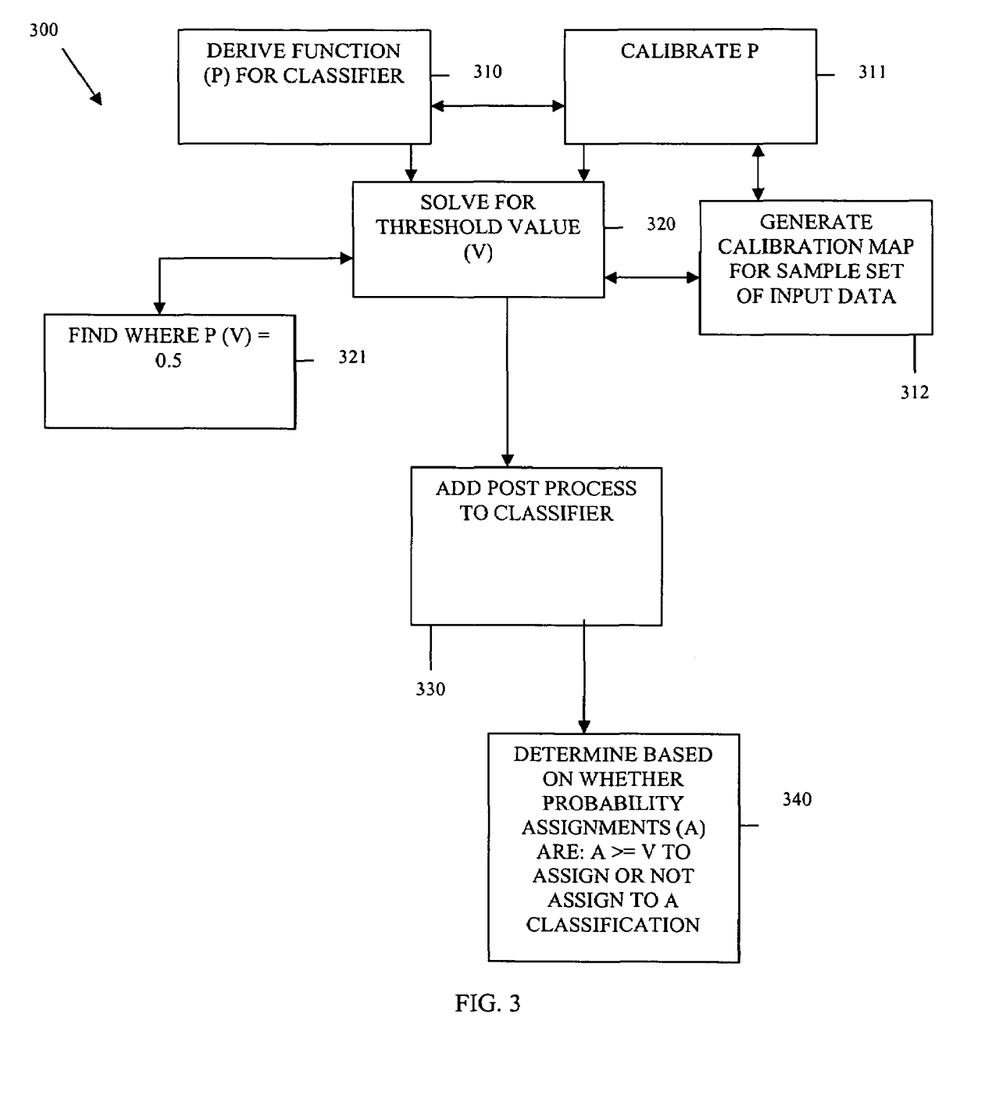
FIG. 3 is a diagram of yet another method for calibrating a classifier, according to an example embodiment.

FIG. 3 is yet another method 300 for calibrating a classifier, according to an example embodiment. The method 300 is implemented in a machine-accessible and readable medium and is optionally accessible over a network. The method 300 is implemented as instructions on a single medium or a combination of media that are logically associated with one another. The medium may be removable, memory, and/or storage. In some embodiments, the instructions may be downloaded from a remote server over a network. In other embodiments, the instructions may be uploaded from removable media. The instructions when loaded into a processing device and accessed perform the method 300 depicted in FIG. 3.

Initially, a classifier that is to be optimized is acquired along with a sample set of input data. A function for the classifier is derived, at 310, based on the output produced by the classifier against the input data. That function (P) is calibrated, at 311. Calibration entails generating, at 312, a calibration map between the outputs of the classifier vis-à-vis the known or expected outputs for the sample set of input data. In some embodiments, the known or expected outputs for the sample set of data is supplied as an electronic file, such that the entire calibration processes is automated with no manual intervention. In other embodiments, the calibration process may be partially manual, such that interactive input screens permit an operator to supply the expected output for the sample set of input data.

The classifier's output and the expected output are expressed as percentages or labels along a scale of 0-1 which indicate whether discrete portions of the input data belong or do not belong to a given classification. The known or expected outputs may be represented as a binary assignment to the portions of the input data, such as a 0 for non classification and 1 for classification. The classifier's output is a percentage from 0-1 which represents a confidence factor that the classifier has that given portions of the input data belong within the given classification, where 0 expresses no confidence and 1 expresses complete confidence in the classification.

At 320, once the calibrated function for the given classifier is derived, the calibration map which the function represents is evaluated in order to solve for a threshold value (V) of the function (P) where when P is supplied V the output produced is a probability of 50% or 0.5. That is, at 321, V is solved for in the equation P(V)=0.5. V provides an indication within the classifier where probability assignments that meet or exceed V belong within a given classification based on the calibration map or P, which maps the classifier's actual outputs to known outputs for a given sample set of input data.

At 330, a post process comparison is added to the output produced from the original classifier. The post process comparison compares, at 340, output probability assignments (A) of the classifier to the derived threshold (T), such that if A>=T then the associated piece of input data is assigned to a given classification; otherwise (A<T) the piece of input data is not assigned to the classification.

Figure 4:
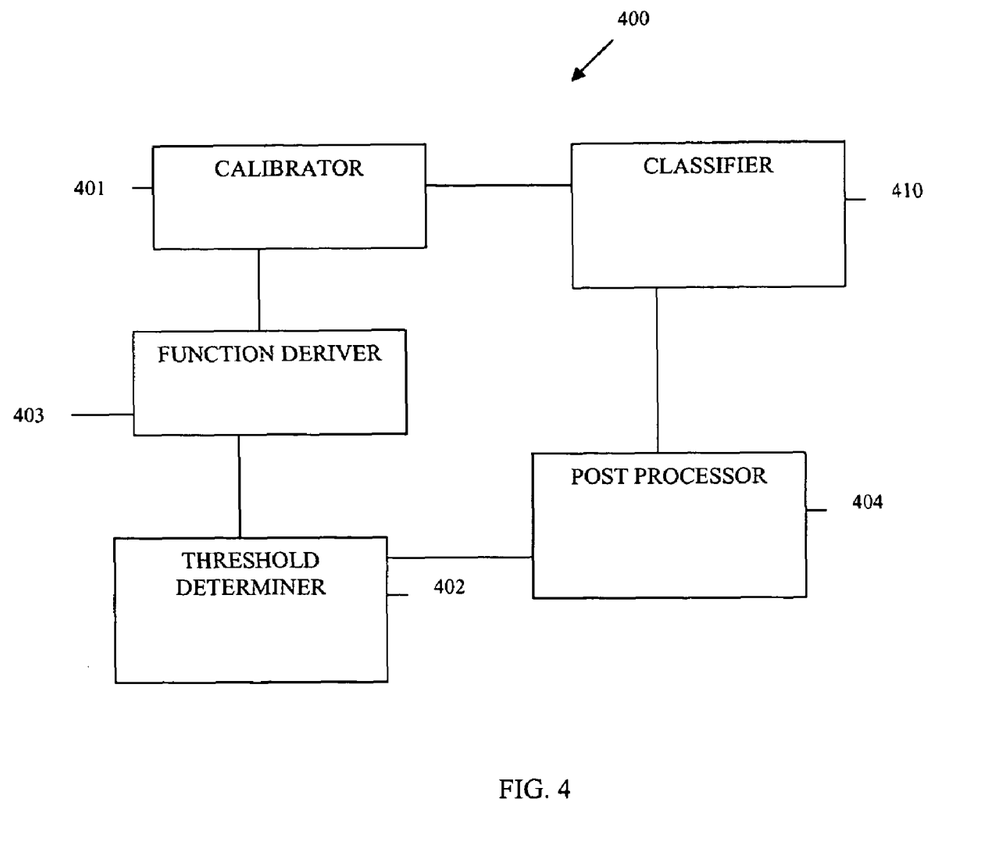
FIG. 4 is a diagram of a classifier calibration system, according to an example embodiment.

FIG. 4 is a diagram of a classifier calibration system 400, according to an example embodiment. The classifier calibration system 400 is implemented in a machine-accessible or readable medium and may be optionally accessible over a network. In one embodiment, the classifier calibration system 400 implements, among other things, the methods 100, 200, and/or 300 of FIGS. 1-3. The classifier calibration system 400 determines an optimal threshold for a given classifier during a calibration process for that classifier. The optimal threshold is used to improve the accuracy of output of the classifier by comparing the output to the threshold in order to make a decision as to whether to assign or not assign a portion of input data to a given classification.

The classifier calibration system 400 minimally includes a calibrator 401 and a threshold determiner 402. In some embodiments, the classifier calibration system 400 also includes a function deriver 403 and a post processor 404. Moreover, the classifier calibration system 400 is processed to optimize the accuracy of a given classifier 410.

The calibrator 401 is a software application or set of applications cooperating as a system or service that receives as input a given classifier 410, a sample set of input data to process through the classifier 410, and known or expected output for the sample set of input data vis-à-vis a given classification. Inputs may be automatically acquired from electronic files, directories, databases, memory, storage, etc. Alternatively, some or all of the inputs may be manually supplied to the calibrator 401 via one or more interfaces.

The calibrator 401 produces from the input a calibration map. The map provides the relationship and mapping between outputs of the given classifier 410 for the sample set of input data to the known or expected output for the sample set of input data. In some embodiments, the calibration map is supplied to a function deriver 403. The function deriver 403 derives a function from the calibration map which models the calibration map. The function can then be interrogated or evaluated for purposes of acquiring various outputs and relationships represented in the calibration map.

The threshold determiner 402 is another software application or service that interrogates the calibration map for purposes of determining a threshold value produced by the given classifier 410 which according to the calibration map indicates a classification is appropriate. The value within the calibration map where classifications to a given classification are appropriately assigned is 0.5 or 50%. Thus, the threshold determiner 402 interrogates the calibration map produced by the calibrator 401 to find a value (V) produced by the classifier 410 where the value within the calibration map is 0.5. In some embodiments, where a function (P) was derived to model the calibration map this may be achieved by solving the equation P (V)=0.5 for V. V becomes the threshold that is resolved by the threshold determiner 402.

In one embodiment, the post processor 403 is a comparison made between output probability assignments (A) from the classifier 410 against the threshold (T) resolved by the threshold determiner 402. The comparison results in a determination as to whether to classify or not classify a piece of input data which was processed by the classifier 410 into a given classification. In one embodiment, the comparison is made such that classification decisions are affirmatively made when A>=T and affirmatively not made when A<T.

The calibrator 401, the threshold determiner 402, the function deriver 403, and the post processor 404 all supplement the processing of the classifier 410 and do not interfere or alter the classifier's normal processing. That is, the classifier calibration system 400 is processed to assist in a decision making process after a classifier 410 processes input data in order to more accurately decide whether to assign or not assign the input data to a given classification.

Figure 5:
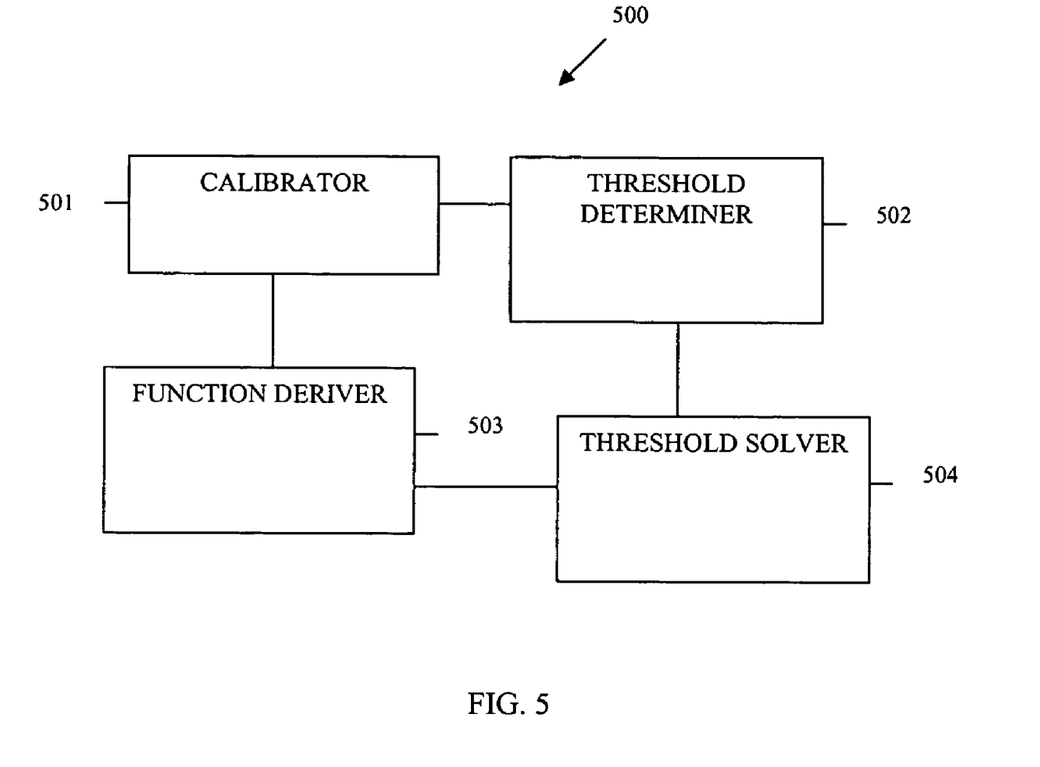
FIG. 5 is a diagram of another classifier calibration system, according to an example embodiment.

FIG. 5 is a diagram of another classifier calibration system 500, according to an example embodiment. The classifier calibration system 500 is implemented in a machine-accessible and readable medium and is optionally accessible over a network. The classifier calibration system 500 determines a novel threshold value for a calibrated classifier and uses that threshold to make a decision as to whether to classify or not classify input data into a given classification after that input data is processed by an original classifier.

The classifier calibration system 500 minimally includes a means for calibrating a classifier (calibrator) 501 and a means for determining a threshold (threshold determiner) 502. In some embodiments, the classifier calibration system 500 also includes a means for deriving a function (function deriver) 503 and a means for solving for a threshold (threshold solver) 504.

The means for calibrating a classifier 501 is implemented within software and/or hardware and produces a calibration map for a sample set of input data processed by a given classifier. The map shows the relationship between a probability distribution produced by the classifier and expected results associated with the sample set of input data. In some embodiments, the means for calibrating a classifier 501 is augmented with a means for deriving a function 503. The means for deriving a function 503 is implemented in software and/or hardware and derives a function that models the calibration map.

The means for determining a threshold 502 is also implemented in software and/or hardware and determines an optimal value that is produced by the given classifier where the calibration map indicates that a 0.5 or 50% probability exists. In cases where a function is available from the means for deriving a function 503, then the means for determining a threshold 502 resolves this threshold value by determining the value which when supplied to the function results in a 0.5 output. In some cases, the means for determining a threshold may enlist a means for solving for a threshold value 504 to resolve the desired threshold value. The means for solving for the threshold value 504 is implemented in software and/or hardware.

During operation of the classifier calibration system 500, the means for calibrating a classifier 501 produces a calibration map for a classifier based on a sample set of input data and expected or known results. The classification map is interrogated by the means for determining a threshold value 502 to determine an output probability assessment produced by the classifier that result in a 0.5 probability within the calibration map.

The resolved threshold is used to compare subsequent probability assignments that the given classifier assigns to portions of processed input data. When a probability assignment meets or exceeds the threshold, the associated portion of input data is assigned to a given classification and when it does not meet or exceed the threshold it is not assigned to the classification. In some embodiments, the means for determining a threshold 502 may actually determine that there exists two or more thresholds which when mapped within the calibration map produce a 0.5 probability. In these circumstances, the probability assignments may be compared to multiple thresholds.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:
    calibrating a classifier to produce a calibration map;
    determining a threshold from the calibration map;
    comparing a probability assignment against the threshold, the probability assignment having been assigned to an input data by the classifier, wherein the probability assignment identifies a confidence factor that the classifier, prior to calibration, has for the input data as to membership of the input data within a classification; and
    assigning the input data to the classification based on the comparing of the probability assignment against the threshold.

2. The method of claim 1 further comprising, deriving a function that models the calibration map before determining the threshold.

3. The method of claim 2, wherein determining the threshold further includes finding a probability assignment value of the classifier prior to calibration that results in the function producing a 0.5 probability assignment by the function, wherein the probability assignment value of the classifier prior to calibration is the threshold.

4. The method of claim 1, wherein calibrating further includes tracking a probability distribution of the classifier for a sample set of input data against expected results for that sample set of input data.

5. The method of claim 1, wherein calibrating further includes determining accuracy results of a probability distribution produced by the classifier for a sample set of input data.

6. The method of claim 5 further comprising, deriving a function for the calibration map in response to the probability distribution, the sample set of input data, and an expected probability distribution for the sample set of data.

7. A method comprising:
    calibrating a classifier for a sample set of input data;
    deriving a threshold for a probability distribution produced by the calibrated classifier for the sample set of data; and
    adding a post process onto the classifier that compares probability assignments for a classification to the threshold, the probability assignments previously produced by the classifier.

8. The method of claim 7 further comprising, deriving at least one additional threshold for the probability distribution.

9. The method of claim 8 further comprising, modifying the post process to compare the probability assignments to the threshold and the at least one additional threshold.

10. The method of claim 7, wherein calibrating further includes producing a calibration map for output of the sample set of input data generated by the classifier to expected results for the sample set of input data.

11. The method of claim 7 further comprising, deriving a function for the calibrated classifier that mimics results of the calibrated classifier, wherein the function is derived based at least in part on the probability distribution and the sample set of input data.

12. The method of claim 11, wherein deriving the threshold further includes finding a value that when provided to the function as input produces a 0.5 probability distribution, and wherein the value is the threshold.

13. The method of claim 7, wherein adding further includes assigning portions of input data to the classification if associated probability assignments assigned to the portions of input data meet or exceed the threshold.

14. A system, comprising:
a calibrator;
a threshold determiner, wherein the calibrator calibrates a classifier, and the threshold determiner in response to the calibrated classifier and a probability distribution for a sample set of input data processed by the calibrated classifier determines one or more thresholds; and
a processor, wherein when a piece of input data is processed by the classifier, the piece of input data receives a probability assignment for a classification, the probability assignment is compared by the processor to the one or more thresholds and if the probability assignment meets or exceeds the one or more thresholds then the piece of input data is assigned to the classification by the processor.

15. The system of claim 14 further comprising, a function deriver that derives a function which represents the probability distribution of the calibrated classifier.

16. The system of claim 15, wherein the threshold determiner solves for one or more values of the function which results in the function producing a 0.5 probability assignment for the classification, and wherein the one or more values become the one or more thresholds.

17. The system of claim 14 further comprising, a post processor that is added after the processing of the classifier, which compares the probability assignments produced by the classifier to the one or more thresholds.

18. A system, comprising:
means for calibrating a classifier; and
means for determining a threshold;
wherein the means for calibrating calibrates the classifier and the means for determining a threshold determines a threshold in response to a probability distribution for a classification, which is produced by the calibrated classifier for a sample set of input data, the threshold is compared against probability assignments for the classification generated by the classifier and in response to that comparison determinations are made to classify or not classify a piece of input data supplied to the classifier.

19. The system of claim 18, wherein the means for calibrating further includes resolving an accuracy rate for the classifier when the classifier processes the sample set of input data.

20. The system of claim 18, wherein the means for determining the threshold further includes means for deriving a function that mimics an output of the calibrated classifier based on the sample set of input data.

21. The system of claim 20, wherein the means for determining the threshold further includes means for solving for a value that when supplied to the function generates a probability assignment of 0.5 for the classification, and wherein the means for determining the threshold assigns the solved value to the threshold.

22. A machine readable medium having recorded thereon instructions for calibrating a classifier, the instructions when executed performing the method comprising:
deriving a function that mimics output results of the classifier for a sample set of input data, wherein the function is calibrated;
solving for a threshold value that when supplied to the function produces a 0.5 probability assignment for a classification; and
adding a post process to the classifier that determines whether a piece of input data processed by the classifier is assigned to the classification or not assigned to the classification based on comparisons of an assigned probability associated with the piece of input data which are made against the threshold value.

23. The medium of claim 22 further comprising instructions for producing a calibration map that maps expected results for the sample set of input data to actual results produced by the classifier for the sample set of input data.

24. The medium of claim 23, wherein deriving further includes instructions for deriving the function in response to the calibration map and features included in the sample set of input data.

25. The medium of claim 22 further comprising instructions for comparing determinations made by the classifier after processing the sample set of input data against pre-defined expected determinations for the sample set of input data.

26. The medium of claim 25, wherein determining further includes instructions for generating a calibration map to map the classifier's determinations to the expected determinations.

27. The method of claim 1, wherein the calibration map is a mapping of probability distribution of one or more components of a sample input data processed by the classifier with expected results of the sample input data.

28. A method to enhance accuracy of a classifier, comprising:
processing first input data through the classifier, wherein the first input data are known input data with a known result;
receiving a first processed result from the classifier, wherein the first processed result is a result of processing the first input data through the classifier;
deriving a calibration map of the classifier, wherein the calibration map is a mapping of the first processed result to the known result;
processing second input data through the classifier and receiving a second processed result from the classifier, wherein the second processed result includes one or more probability assignments, wherein each probability assignment corresponds to a component of the second input data, and wherein each probability assignment represents a probability that the corresponding component of the second input data belongs in a pre-defined classification as determined by the classifier;
augmenting the second process result from the classifier based on the calibration map; and
outputting the augmented result.

29. The method of claim 28,
wherein the first result includes one or more probability assignments, wherein each probability assignment corresponds to a component of the first input data, and wherein each probability assignment represents a probability that the corresponding component of the first input data belongs in the pre-defined classification as determined by the classifier,
the method further comprising:
determining a threshold T for the classifier based on the calibration map, wherein the threshold T is a particular probability assignment value such that a predetermined ratio of components of the first input data are assigned by the classifier to be at or above the threshold T and the rest of the components are below the threshold T.

30. The method of claim 29, wherein the predetermined ratio is 0.5.

31. The method of claim 29, wherein augmenting comprises performing for each component of the second processed result steps of:
   comparing the probability assignment A of the component to the threshold T; and
   classifying the component as belonging in the pre-defined classification if A >=T and not classifying the component as belonging in the pre-defined classification otherwise.

32. The method of claim 28, wherein the classifier is not altered such that the classifier will produce identical results to identical data inputs.

33. The method of claim 28, wherein the classifier performs any one or more of identifying inappropriate emails, identifying unsolicited emails, identifying potential viruses, and projecting performance or load of hardware and/or software resources.

* * * * *